United States Patent [19]

Banas

[11] 4,152,575
[45] May 1, 1979

[54] METHOD OF MATERIAL PROCESSING UTILIZING AN INTERRUPTED BEAM OF CONTINUOUS WAVE LASER RADIATION

[75] Inventor: Conrad M. Banas, Bolton, Conn.

[73] Assignee: United Technologies Corporation, Hartford, Conn.

[21] Appl. No.: 915,085

[22] Filed: Jun. 12, 1978

[51] Int. Cl.² .............................................. B23K 9/00
[52] U.S. Cl. ........................................... 219/121 LM
[58] Field of Search ...................... 219/121 L, 121 LM

[56] References Cited

U.S. PATENT DOCUMENTS

| | | | |
|---|---|---|---|
| 3,378,686 | 4/1968 | Langmuir | 250/199 |
| 3,588,440 | 6/1971 | Morse | 219/121 |
| 3,659,613 | 5/1972 | Bredemeier | 123/395 |
| 3,824,368 | 7/1974 | Locke | 219/121 |
| 3,860,784 | 1/1975 | Brown et al. | 219/121 |
| 4,000,392 | 12/1976 | Banas et al. | 219/121 LM |

Primary Examiner—J. V. Truhe
Assistant Examiner—Fred E. Bell
Attorney, Agent, or Firm—Lawrence A. Cavanaugh

[57] ABSTRACT

A method of material processing, in particular welding, utilizing high frequency interruption of a continuous wave beam of radiation is disclosed. The pulses of laser radiation are generated at a pulse repetition rate more rapid than the thermal response time of the material, typically greater than one kilohertz, wherein the material reacts with the pulses such that the characteristics of the surface reflectivity of the material are dominated by the peak power in the pulse and the characteristics of the melting of the material are controlled by the average power of the pulses. The duration of each pulse is controlled to be less than the time required to generate a beam absorbing plasma adjacent the weld zone. The absence of beam absorbing plasma and the efficient destruction of the reflectivity of the surface of the material results in increased welding efficiency and/or increased welding speed.

8 Claims, 6 Drawing Figures

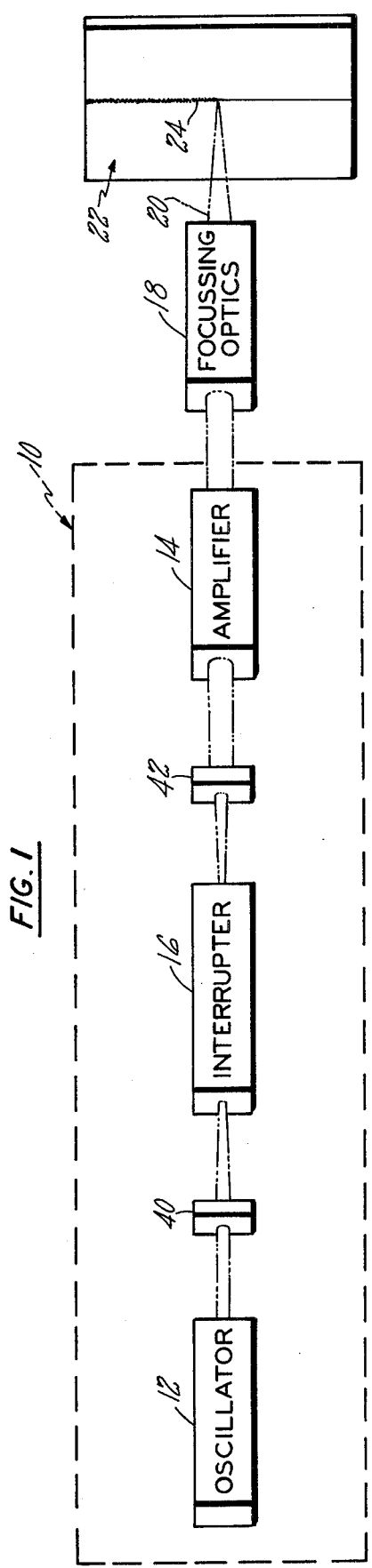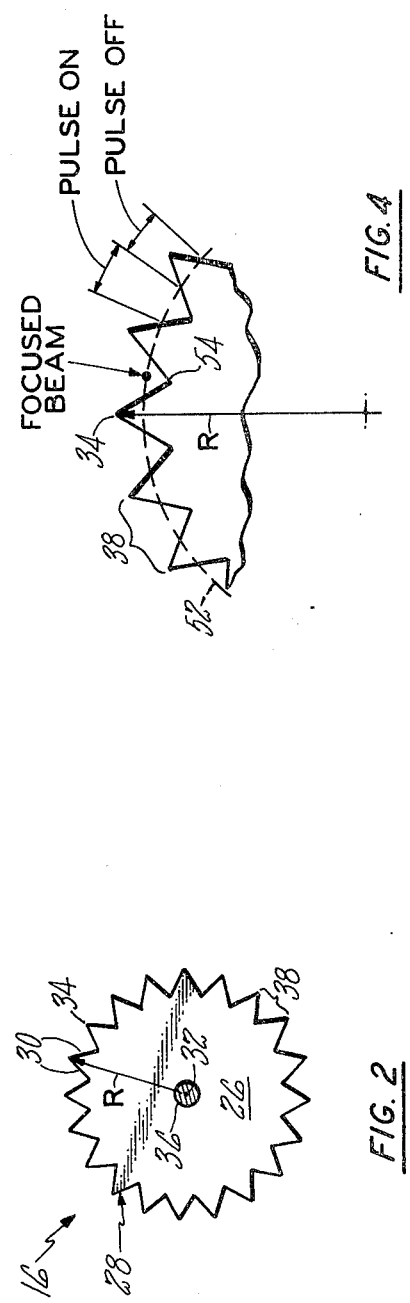

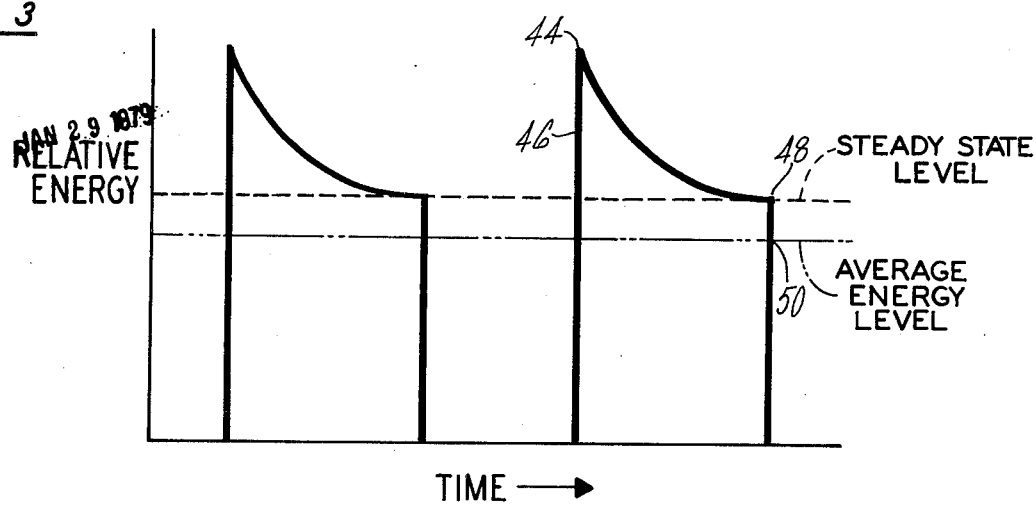
FIG. 3
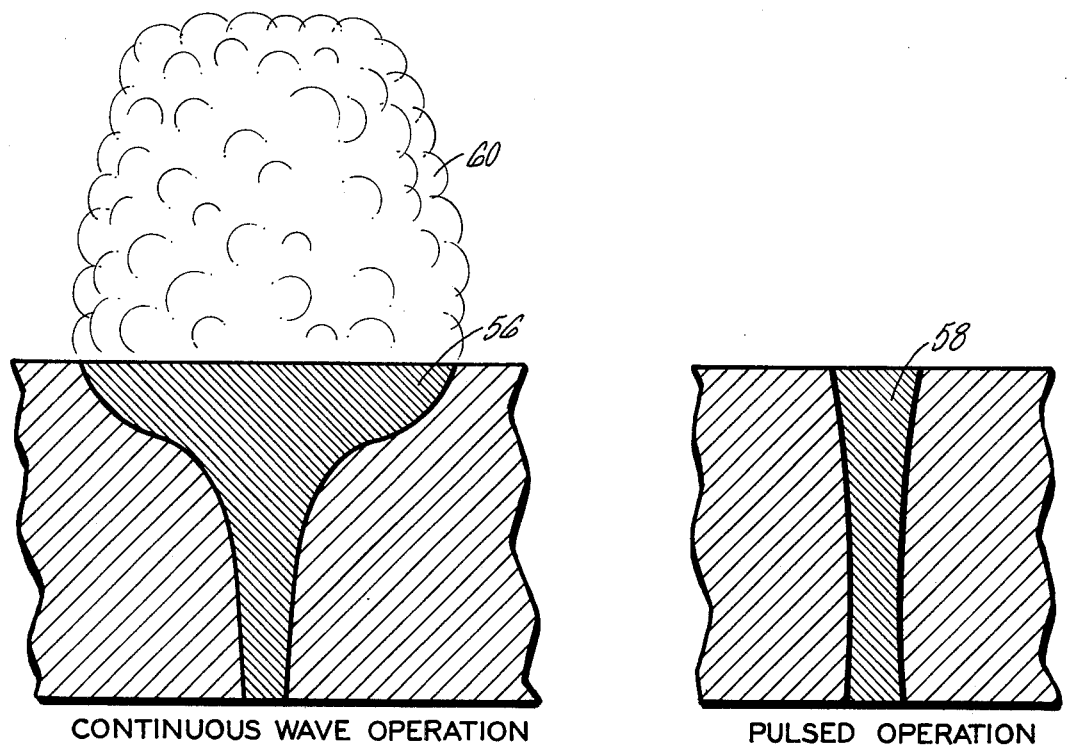
FIG. 5A PRIOR ART — CONTINUOUS WAVE OPERATION
FIG. 5B — PULSED OPERATION

METHOD OF MATERIAL PROCESSING UTILIZING AN INTERRUPTED BEAM OF CONTINUOUS WAVE LASER RADIATION

BACKGROUND OF THE INVENTION

This invention relates to material processing and more specifically to a method of providing pulses of laser radiation having pulse characteristics resulting in high absorption within a material.

Material processing by means of focused laser radiation is well known in the art. Materials, in particular metals, have been welded, cut, surface treated, drilled, etc., utilizing laser radiation in the pulsed and continuous wave modes with wavelengths varying from the ultraviolet to the infrared. The utilization of laser radiation with wavelengths in the infrared for welding and cutting of materials such as metals has been hindered by the high surface reflectivity of most metals to radiation having wavelengths in the infrared. Additionally, once the high surface reflectivity has been destroyed by the interaction of the radiation with the surface of the material, a plasma resulting from the melting and vaporization of the material is typically generated juxtaposed the surface along the path of the radiation. The plasma is typically highly absorptive of the radiation resulting in a reduction of the intensity of the radiation incident on the workpiece and a corresponding reduction in the efficiency of the material processing. For welding applications, the initial high reflectivity of metals can be significantly reduced and/or eliminated by establishment of the so-called deep penetration welding mode of operation well known in the art. In high reflectivity materials, such as aluminum alloys, copper, etc., the threshold power density for the destruction of the surface reflectivity is typically considerably above the level appropriate for establishing a uniform fusion zone. Thus the situation arises in which either nearly complete reflection of the incident radiation occurs or, upon the destruction of the surface reflectivity, excessive energy absorption occurs with resulting explosive boiling and porous weld formation.

Attempts to obviate this problem by initiating the welding process with a high energy beam to destroy the reflectivity followed by a reduction in the energy level to effect the weld have not been successful; reflection-dominated behavior reoccurs as energy level is decreased. Thus, the welding process will not continue if the energy in the beam is decreased below the threshold level. Morse in U.S. Pat. No. 3,588,440 filed June 26, 1969 discloses a laser combination energy system utilizing a first and second laser for material processing wherein the first laser is adapted to provide a high power pulse to effectively destroy surface reflectivity and the second laser is adapted to supply a continuous laser beam for maintaining the melt. Brown et al in U.S. Pat. No. 3,860,784 filed March 14, 1973 entitled "Deep Penetration Welding Using Lasers" and held with the present application by a common assignee discloses a method of utilizing a laser beam for deep penetration welding wherein the power in the beam is sufficiently high to overcome the relatively high reflectivity of a metallic workpiece. A molten zone generated by the interaction of the radiation and the workpiece is moved relative to the laser beam at a speed of at least ten focused spot diameters to allow the molten zone to become dynamically stable and translate through the material to form the weld. Once deep penetration welding is initiated effective beam absorption occurs.

Several methods are known in the art for suppressing the formation of a plasma juxtaposed the workpiece. Locke in U.S. Pat. No. 3,824,368 filed Jan. 11, 1973 discloses a method of welding in which a concentrated high power laser beam is moved along a workpiece surface with a flow of inert gas directed across the path of the beam adjacent the area where the radiation interacts with the workpiece to inhibit the formation of a beam absorbing plasma. The flow of gas suppresses the formation of the plasma and improves the metal working process by allowing the laser energy to pass uninhibited to the workpiece. In addition Banas et al in U.S. Pat. No. 4,000,392 filed Dec. 9, 1975 and Banas et al in U.S. Pat. No. 4,078,167 filed Feb. 9, 1977, both held with the present application by a common assignee, disclose welding devices adapted for use with a laser beam which are adapted for providing a stream of suppression gas across the path of a welding beam to suppress the formation of a beam absorbing plasma. The amount of gas flow is typically directly proportional to the power level of the laser beam. However, flowing a gas across the interaction zone for plasma suppression conflicts with the requirements of a quiescent weld zone for the generation of a smooth contamination free weld.

SUMMARY OF THE INVENTION

A primary object of the present invention is to accomplish metal joining utilizing laser radiation.

A further object of the present invention is to improve the efficiency of utilizing laser radiation to accomplish metal joining.

According to the present invention continuous wave radiation from a laser oscillator is repetitively interrupted with an interrupter means to provide pulses of radiation which are intensified by an amplifier and focused onto a workpiece to form a weld zone therein. The energy distribution within each pulse is intensified upon passing through the amplifier to provide pulses having a leading edge with an energy spike which decays to a steady state value at the trailing edge. Interacting the pulse of radiation with the workpiece results in the energy spike effectively destroying the surface reflectivity and initiating the melt with the remaining energy of the pulse being absorbed by the melt to form the weld zone.

A primary feature of the present invention is high frequency interruption of a continuous wave laser beam having high power to produce pulses of radiation capable of material processing. As each pulse passes through the amplifier a portion of the energy stored within the amplifier is swept out forming an output pulse having a high steady state energy with an energy spike at the leading edge of the pulse. During the time interval between pulses, typically ten to one hundred microseconds, the energy within the amplifier is restored. Additionally the continuous wave beam provided by the oscillator is interrupted at a frequency sufficient to provide pulse repetition more rapid than the thermal response time of the material of the workpiece, typically greater than one kilohertz. The pulses react with the workpiece such that the reflection characteristics of the workpiece are dominated by the peak energy of the pulse and melting characteristics are controlled by the average power in the pulses. Additionally, the duration of each pulse is controlled to be less than the time required for the formation of a plasma adjacent the workpiece, typically less than eight hundred microseconds.

A primary advantage of the present invention is the enhanced materials processing capability of laser radiation. The high peak power of the leading edge of the pulse effectively destroys the reflectivity of the material to allow absorption of the average power of the pulse within the material such that increased welding efficiencies and material cutting capabilities are readily attainable. Additionally, maintaining the pulse duration to be less than the plasma formation time effectively suppresses the formation of a beam absorbing plasma at the surface of the workpiece. In laser welding applications the suppression of the plasma eliminates the characteristic nailhead structure of the weld resulting in a narrower, more parallel-sided weld zone and increased welding speed for a given pulse power and penetration characteristics.

The foregoing and other objects, features and advantages of the present invention will become more apparent in the light of the following detailed description of a preferred embodiment thereof as illustrated in the accompanying drawing.

BRIEF DESCRIPTION OF THE DRAWING

FIG. 1 is a simplified schematic of a laser welding system in accordance with the present invention;

FIG. 2 is a simplified schematic of a beam interrupter as shown in FIG. 1.

FIG. 3 is a simplified chart showing the configuration of sequential pulses;

FIG. 4 is an enlarged view showing a portion of the beam interrupter shown in FIG. 2;

FIG. 5A shows a weld obtained utilizing the prior art; and

FIG. 5B shows a weld obtained utilizing the present invention.

DESCRIPTION OF THE PREFERRED EMBODIMENT

Referring now to FIG. 1 there is shown a preferred embodiment of the present invention. A source of radiation 10 preferably including an oscillator 12 and an amplifier 14 is adapted for providing continuous wave radiation having high power. A beam interrupter 16, more fully disclosed hereinafter, adapted for interrupting the continuous wave beam to provide pulses of radiation is positioned between the oscillator and the amplifier. The focussing optics 18 are adapted for focussing radiation 20 onto a target 22. The target is typically mounted on an adjustable holder (not shown) adapted for translating the target relative to the path of the pulses of radiation to form a weld bead 24. It is to be recognized that a stationary target may also be utilized with the relative motion obtained by moving the path of the radiation across the target with means well known in the art.

In accordance with the present invention the oscillator, typically a carbon dioxide laser, is adjusted to provide a continuous wave beam which is intensified by the amplifier 14 and passes to the focussing optics 18 as a beam of radiation having high power. In the preferred embodiment the beam interrupter 16, as shown in FIG. 2, comprises a disc 26 having teeth 28 symmetrically disposed about the circumference of the disc in the manner of a rotary saw blade. The teeth 28 have sides 30 symmetrically disposed about a radius R extending from the center 32 of the disc to the apex 34 of the teeth.

The disc is adapted for rotation by a rod 36 attached at one end to the center of the disc and at the other end to a means for rotating the rod at high speed (not shown). The beam interrupter is positioned between the oscillator and the amplifier such that the continuous wave beam for the oscillator 12 passes through the spacing 38 between adjacent teeth. As the disc rotates, the teeth repetitively interrupt the beam to provide pulses of radiation. In a preferred embodiment of the output from the oscillator 12 is focused on the spacing 38 between adjacent teeth 28 by optics means 40 as shown in FIG. 1. Collimating optics 42 positioned between the beam interrupter and the amplifier are adapted for collecting the radiation expanding from the focal point and for providing collimated radiation to the amplifier.

In operation, as the disc rotates, the teeth pass through the path of the laser beam producing a periodic interruption of the beam to provide pulses at a pulse repetition rate equal to $N \times F$ where N is the number of teeth along the circumference of the disc and F is the frequency of rotation. The power level of the radiation emitted from the oscillator is typically low to avoid breakdown of the atmosphere in the spacing 38 between adjacent teeth at the focal point of the focusing optics 40 and to allow the utilization of readily available focusing optics, without requiring complex cooling apparatus. The relatively low power beam from the oscillator is intensified to a high power beam upon passing through the amplifier.

The beam interrupter produces a pulse typically having a rectangular shape with a width typically less than eight hundred microseconds which when passed through the amplifier results in an output pulse having an energy spike 44 near the leading edge 46 as shown in FIG. 3. The high energy spike at the leading edge of the pulse decays to a steady state value 48 at the trailing edge 50 of the pulse. The high energy spike results from a cavity dumping effect of each pulse traveling through the amplifier. As the pulse proceeds through the amplifier the leading edge is intensified which depletes the population inversion available for the remaining portion of the pulse resulting in the shape as shown in FIG. 3. Since energy is supplied to the amplifier at a steady rate, if the time separation between pulses is sufficiently long, typically from ten to one hundred microseconds, the energy stored in the amplifier is replenished between each pulse and the average energy of the radiation incident onto a target is only slightly lower than the steady state energy available from the continuous wave beam as shown in FIG. 3. The pulses passing through the amplifier are focused to a high energy density by the focusing optics 18 and react with the workpiece material.

If the repetition rate of the pulses is more rapid than the thermal response time of the material, i.e., greater than approximately one kilohertz, the material of the workpiece will react with the spike dominated portion of the pulse to effectively destroy the reflection characteristics of the material while the absorption characteristics of the material will be characterized by the overall average power level. The pulse repetition rate must be adjusted to produce the energy spike at the leading edge of the pulse while maintaining a sufficient amount of energy within each pulse to maintain the molten state of the material between pulses. Thus the thermal response of the material is similar to that of a steady state beam but with enhanced coupling. Smooth fusion of workpiece material can then be maintained with a deep penetration mode of operation of the laser with a minimum loss of energy by reflection. Smooth fusion is obtained in a given workpiece material by appropriate selection of the energy within each pulse and by proper control of the duty cycle of the pulses. As shown in FIG. 4 the duty cycle is controlled by varying the radial position 52 of the focused oscillator beam as it passes through the spacings 38 between adjacent teeth of the interrupting disc. As the radial position of the focused beam increases from the base 54 of the spacing 38 to the apex 34 the pulse length increases from the minimum near the base to a maximum near the apex. The separation between pulses is a maximum when the beam is focused near the base and is a minimum when the beam is focused at a radial position near the apex. Focussing the beam at a radial position greater than the apex results in a continuous wave radiation incident in the target.

As an example of the effectiveness of the process, the present invention is capable of providing full penetration of a one-quarter inch thick copper target material at three kilowatts of average power with a beam spot diameter of 0.03 inch. By contrast, operating the laser system in the continuous wave mode, essentially complete reflection occurs for the one-quarter inch thick copper target at power levels as high as fifteen kilowatts. Additionally, in a welding application with the disc rotated at six kilohertz and having teeth symmetrically disposed about the disc to provide a forty-two microsecond off and a one-hundred-twenty-six microsecond on time, i.e., a seventy-five percent duty cycle, the welding speed for a one-half inch thick piece of steel was eighty inches per minute at an average power of fourteen kilowatts. With a continuous wave power of fourteen kilowatts, the welding speed was fifty inches per minute. Furthermore as shown in FIG. 5A the characteristic nailhead 56 of prior art welding methods was not apparent. Instead, the weld profile 58 as shown in FIG. 5B was exhibited using the interrupted mode of operation. The nailhead produced by prior art welding methods is typically associated with heat transfer from a beam absorbing plasma 60 as shown in FIG. 5A typically extending well out of a vapor cavity in the surface of the workpiece along the path of the beam. The energy of the beam absorbed by the plasma is conducted and convected to the surface of the material causing a broadening of the incident energy distribution and resulting in a relatively large heat affected area near the surface of the material. It is to be noted that the nailhead configuration typically remains even with the use of prior art gas flow plasma suppression devices, since the plasma extinction is not complete with these devices. The absence of the characteristic nailhead in the weld 58 generated in accordance with the present method of operation indicates that a plasma does not exist juxtaposed the surface of the material. As shown in FIG. 5B not only is the nailhead not evident in the welds made in the interrupted mode but the weld zone is more parallel sided. It is apparent that the total volume of fused material remains essentially the same such that energy previously utilized to fuse the nailhead is now used to promote useful joining. Weld speed therefore increases in proportion to the quantity of material removal from the nailhead.

Confining the duration of each pulse to a period less than the time required for the formation of the plasma while maintaining a sufficiently high pulse repetition rate to supply sufficient energy to the material to maintain the melt results in the generation of welds without the generation of a plasma. The pulse duration is controlled to be typically less than eight hundred microseconds. Thus at an equivalent average energy, significantly higher welding speeds can be achieved with the interrupted beam technique than with a continuous wave beam. Further, materials with high initial reflectivity can be effectively welded at an average power level substantially below that required for welding with a continuous beam.

While this invention has been described in terms of its preferred embodiment utilizing an oscillator-amplifier configuration it is to be recognized that interrupting a high power continuous wave beam from an oscillator at a sufficiently rapid rate should effectively eliminate the formation of a plasma juxtaposed the surface of the material. The utilization of an amplifier provides the added benefit of higher pulse intensity in the pulse due to the pulse shaping effect of the amplifier.

Although this invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. A method for joining materials with laser radiation comprising:
   providing a source of radiation adapted for producing a continuous beam of laser radiation;
   interrupting the continuous beam of laser radiation with a beam interrupter to provide pulses of radiation;
   controlling the beam interrupter to provide the pulses at a pulse repetition rate more rapid than the thermal response time of the material being joined;
   controlling the beam interrupter to enable each of the pulses to have a pulse duration less than the time required for a plasma to form juxtaposed the surface of the workpiece being joined;
   passing the pulses of radiation through focussing optics to obtain high energy density radiation incident onto the surface of the material; and
   interacting the pulses of radiation with the workpiece to effectively destroy the reflectivity of the surface of the material and to absorb the energy of the pulse within the material to form a melt without the formation of a beam absorbing plasma.

2. The invention in accordance with claim 1 further including translating the target relative to the path of the pulses to form a weld zone.

3. The invention in accordance with claim 2 further including controlling the energy in the pulse to obtain a smooth fusion of the workpiece material with a minimum loss of energy by reflection from the workpiece surface.

4. A method for joining materials with laser radiation comprising:
   providing a source of radiation adapted for producing a continuous beam of laser radiation having low power;
   interrupting the continuous beam of radiation with a beam interrupter to provide pulses or radiation;
   passing the pulses of radiation through an amplifier to obtain pulses having high energy;

controlling the beam interrupter to provide the pulses at a pulse repetition rate more rapid than the thermal response time of the material being joined;

controlling the beam interrupter to enable each of the pulses to have a pulse duration less than the time required for a plasma to be formed juxtaposed the surface of the workpiece being joined;

passing the pulses or radiation through focussing optics to obtain high energy density radiation incident onto the surface of the material; and interacting the pulses of radiation with the workpiece to effectively destroy the reflectivity of the surface of the material and to absorb the energy of the pulse within the material to form a melt without the formation of a beam absorbing plasma.

5. The invention in accordance with claim 4 further including controlling the beam interrupter to provide a time duration between pulses sufficient to allow the amplifier to replenish the energy swept out of the amplifier by the previous pulse passing therethrough.

6. The invention in accordance with claim 5 wherein the pulses passing through the amplifier have a pulse shape characterised by an energy spike at the leading edge of the pulse.

7. The invention in accordance with claim 1 or 4 wherein the pulses are provided at a pulse repetition rate greater than one kilohertz.

8. The invention in accordance with claim 1 or 4 wherein the pulse duration of each pulse is less than eight hundred microseconds.

* * * * *